US011258809B2

(12) United States Patent
Novikov et al.

(10) Patent No.: US 11,258,809 B2
(45) Date of Patent: Feb. 22, 2022

(54) TARGETED ATTACK DETECTION SYSTEM

(71) Applicant: Wallarm, Inc., South San Francisco, CA (US)

(72) Inventors: Ivan Novikov, San Francisco, CA (US); Alexander Golovko, Novoivanovskoe (RU)

(73) Assignee: Wallarm, Inc., San Francisco, CA (US)

( * ) Notice: Subject to any disclaimer, the term of this patent is extended or adjusted under 35 U.S.C. 154(b) by 315 days.

(21) Appl. No.: 16/515,883

(22) Filed: Jul. 18, 2019

(65) Prior Publication Data

US 2020/0036736 A1 Jan. 30, 2020

Related U.S. Application Data

(60) Provisional application No. 62/703,728, filed on Jul. 26, 2018.

(51) Int. Cl.
*H04L 29/06* (2006.01)

(52) U.S. Cl.
CPC ...... *H04L 63/1416* (2013.01); *H04L 63/1425* (2013.01); *H04L 63/1433* (2013.01); *H04L 63/306* (2013.01)

(58) Field of Classification Search
CPC ............. H04L 63/1416; H04L 63/1425; H04L 63/1433; H04L 63/306
See application file for complete search history.

(56) References Cited

U.S. PATENT DOCUMENTS

| 8,806,629 | B1* | 8/2014 | Cherepov | H04L 63/1416 726/23 |
| 2004/0073800 | A1* | 4/2004 | Shah | G06F 21/577 713/176 |
| 2008/0101223 | A1* | 5/2008 | de los Reyes | H04L 63/145 370/230 |
| 2014/0013434 | A1* | 1/2014 | Ranum | H04L 61/1511 726/24 |
| 2015/0067858 | A1* | 3/2015 | Loriot | H04L 63/1441 726/23 |
| 2016/0173526 | A1* | 6/2016 | Kasman | H04L 63/1458 726/23 |
| 2017/0078315 | A1* | 3/2017 | Allen | H04L 63/1441 |

(Continued)

FOREIGN PATENT DOCUMENTS

WO WO-2021154724 A1 * 8/2021 ......... H04L 63/1483

*Primary Examiner* — Sarah Su
(74) *Attorney, Agent, or Firm* — Ascenda Law Group, PC

(57) ABSTRACT

Systems and methods for targeted attack detection. A protection system intercepts traffic destined for a protected system and only traffic identified as non-malicious is allowed to pass thereto. Data collection agents (DCAs) instantiated at protected systems report information concerning protected system resources to the protection system, which creates from that information a set of threat attack detection metrics (TADMs) by which it evaluates payloads of the intercepted traffic. In particular, the intercepted traffic is assessed using conventional threat detection approaches to identify suspect payloads. The suspect payloads are additionally evaluated against the TADMs to determine if they contain any references to specific resources of the protected system. For those of the suspect payloads for which the TADM evaluation reveals positive results, the protection system provides an alert that a targeted attack has been recognized.

17 Claims, 2 Drawing Sheets

(56) References Cited

U.S. PATENT DOCUMENTS

| | | | | |
|---|---|---|---|---|
| 2017/0148063 | A1* | 5/2017 | Ung | G06Q 30/0261 |
| 2017/0149830 | A1* | 5/2017 | Kim | H04L 63/1425 |
| 2017/0346839 | A1* | 11/2017 | Peppe | H04L 63/1433 |
| 2018/0109555 | A1* | 4/2018 | Reddy | G06F 21/554 |
| 2018/0124093 | A1* | 5/2018 | Schwartz | H04W 12/12 |
| 2018/0165597 | A1* | 6/2018 | Jordan | G06N 7/005 |
| 2018/0343281 | A1* | 11/2018 | Ahuja | H04L 63/105 |
| 2019/0222586 | A1* | 7/2019 | Sachkov | H04L 63/1416 |
| 2019/0297092 | A1* | 9/2019 | Shibahara | H04L 63/168 |
| 2019/0394234 | A1* | 12/2019 | Kfir | H04L 63/20 |
| 2021/0005332 | A1* | 1/2021 | D'Angio | H04L 63/1441 |
| 2021/0067564 | A1* | 3/2021 | J S | H04L 63/029 |

\* cited by examiner

TARGETED ATTACK DETECTION SYSTEM

RELATED APPLICATIONS

This is a NONPROVISIONAL of, claims priority to, and incorporates by reference U.S. Provisional Application 62/703,728, filed Jul. 26, 2018.

FIELD OF THE INVENTION

The present invention relates generally to security functions for computer-based environments, and, more particularly, to such solutions as provide targeted attack detection.

BACKGROUND

Within the field of security solutions for computer-based environments, and despite differences in architecture and data flow within such environments, traditional approaches to attack detection have relied on a few well-known methodologies to uncover malicious payloads. These payloads are, generally, data items transmitted to targeted systems either over a network or locally, and often are executables designed to exploit a known or suspected vulnerability of the targeted systems. Targeted attacks are of special concern to system operators and developers because they evidence a certain level of expertise. Often, targeted attacks will entail a series of intrusions rather than isolated or random events and will be associated with a period of intelligence gathering during which an attacker will attempt to uncover information about the targeted system. Once underway, the attack will seek to transfer data from the targeted system while remaining undetected.

Existing attack detection systems, e.g., intrusion prevention systems (IPS), intrusion detection systems (IDS), anti-virus (AV) applications, Web application firewalls (WAF), etc., are designed to detect payloads. Such detection may rely on one or more of: signature-based approaches, in which payload data is matched to examples stored in a database, statistical modeling of data included within payloads, heuristic rules applied to payload data, behavior rules applied to a source of the payload data, or even analytical approaches that allow the payloads to run in a sandbox environment in order to observe the result. While beneficial, these approaches cannot resolve whether or not the payloads are associated with targeted attacks; that is, attacks directed at specific resources of the targeted systems.

SUMMARY OF THE INVENTION

Systems and methods for targeted attack detection in accordance with embodiments of the present invention involve a protection system intercepting traffic destined for a protected system. The protection system receives information from one or more data collection agents (DCAs) instantiated at respective protected systems (e.g., computer systems, servers, operating systems running on computer systems, databases, filesystems, applications running on computer systems, etc.) and creates from that information a set of threat attack detection metrics (TADMs) by which the protection system evaluates payloads of the intercepted traffic. In particular, the intercepted traffic is assessed using conventional threat detection approaches, such as signature-based approaches, statistical modeling of data within payloads, heuristic rules, behavioral rules, and/or analytical approaches to identify suspect payloads in the intercepted traffic. For the suspect payloads, the protection system additionally evaluates them against the TADMs to determine if the suspect payloads contain any references to specific resources of the protected system. For those of the suspect payloads for which the TADM evaluation reveals positive results, the protection system provides an alert that a targeted attack has been recognized. Only traffic identified as non-malicious is allowed to pass to the protected systems.

The TADMs are created using actual resource identifiers of the protected systems as reported by the DCAs. For example, the information received from the DCAs may be any of: SQL/no SQL database names, table names, column names, data types, and object structures; file names, sizes, and other attributes; application class names, packages, and namespaces; and system library names, versions, hash sums, binary offsets of functions symbols inside libraries. The protection system creates the TADMs by generating metrics that characterize potential targeted attacks based on the received information from the DCAs. For example, such metrics may be any of: range metrics derived from numeric data, hashes for strings, regular expressions for strings, data trees for hierarchical data, exported symbols of shared libraries and DLLs, offsets of functions in shared libraries and DLLs, domain name system (DNS) requests sent by the protected systems, and errors of kernel, applications, and services run on the protected systems. Evaluating the suspect payloads against the TADMs to determine if the suspect payloads contain any references to specific resources of the protected system may include calculating TADMs for the suspect payload and comparing them to TADMs of the protected system for which the suspect payload is destined.

BRIEF DESCRIPTION OF THE DRAWINGS

The present invention is illustrated by way of example, and not limitation, in the figures of the accompanying drawings, in which.

DESCRIPTION

The present invention improves upon existing attack detection systems by adding the dimension of targeted attack detection to those systems. More specifically, attack detection systems configured in accordance with embodiments of the present invention are configured to classify payloads that have been identified through one or more conventional detection approaches, such as those mentioned above. The resulting improvement in attack detection allows for enhanced risk analysis, a reduction in false positive reporting, and attack classification.

To better appreciate the enhancement afforded by the present invention, consider the case of structured query language (SQL)-injection payloads. SQL injection is a technique often used to attack Web-based applications in which malicious SQL statements are inserted (injected) as input values in entry fields of the application, for example entry fields seeking a username or other parameter. The injected SQL statements are intended to manipulate backend databases such that when the application executes the SQL statement the database contents are downloaded to the attacker. In the case of the username example, if instead of an actual username an attacker enters an input designed to download contents of a username database then user privacy, among other things, may be compromised if the targeted system is vulnerable to this kind of query injection. In a more sophisticated attack, the injected query may include a reference to a specific table or other resource in the database. For systems configured in accordance with embodiments of the present invention, distinctions between SQL-injection payloads that have such specific references versus those that do not are possible.

The present invention provides such abilities by obtaining actual resource data from the protected systems, either using installed agents, or by receiving operator input, or both, and creating a set of threat attack detection metrics (TADMs) by which the protection system can evaluate payloads. For example, for the case of SQL-injection threats, a protection system configured in accordance with the present invention may obtain SQL/noSQL table and column names directly from the protected system and/or from a network administrator and identify targeted attacks from the pool of detected attacks registered by the protection system by applying TADMs developed using those specific table and column names. It is important to recognize that the TADMs are not merely more signatures against which payloads are assessed, but they do build on signature matching approaches as found in conventional threat detection systems.

Figure 1:
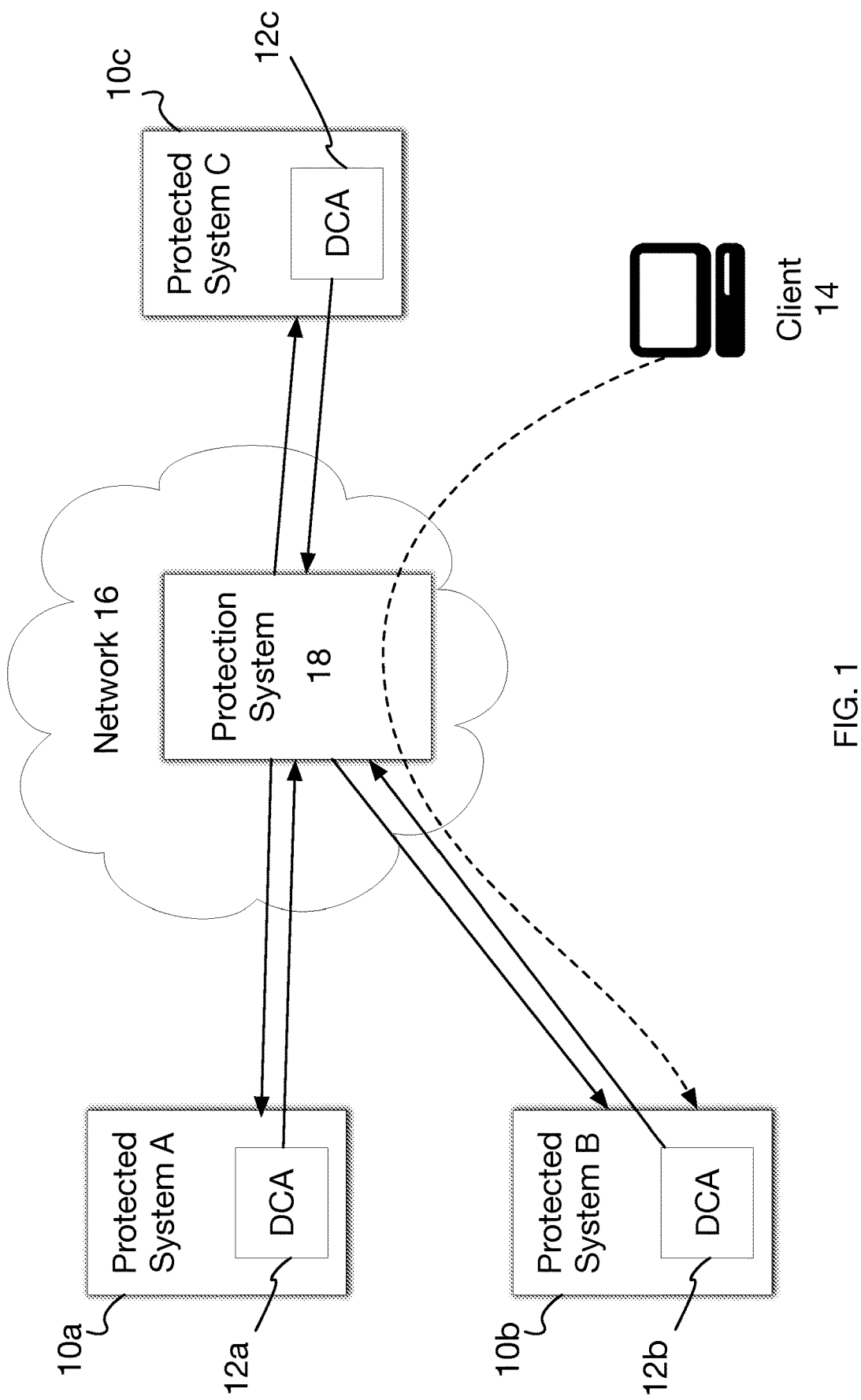
FIGS. 1 and 2 illustrate aspects of an architecture in which protected systems are instrumented with data collection agents (DCAs) that gather information collected from the protected system and report same to a cloud-based protection system configured to generate threat attack detection metrics (TADMs) from that data, in accordance with embodiments of the present invention.
Figure 2:
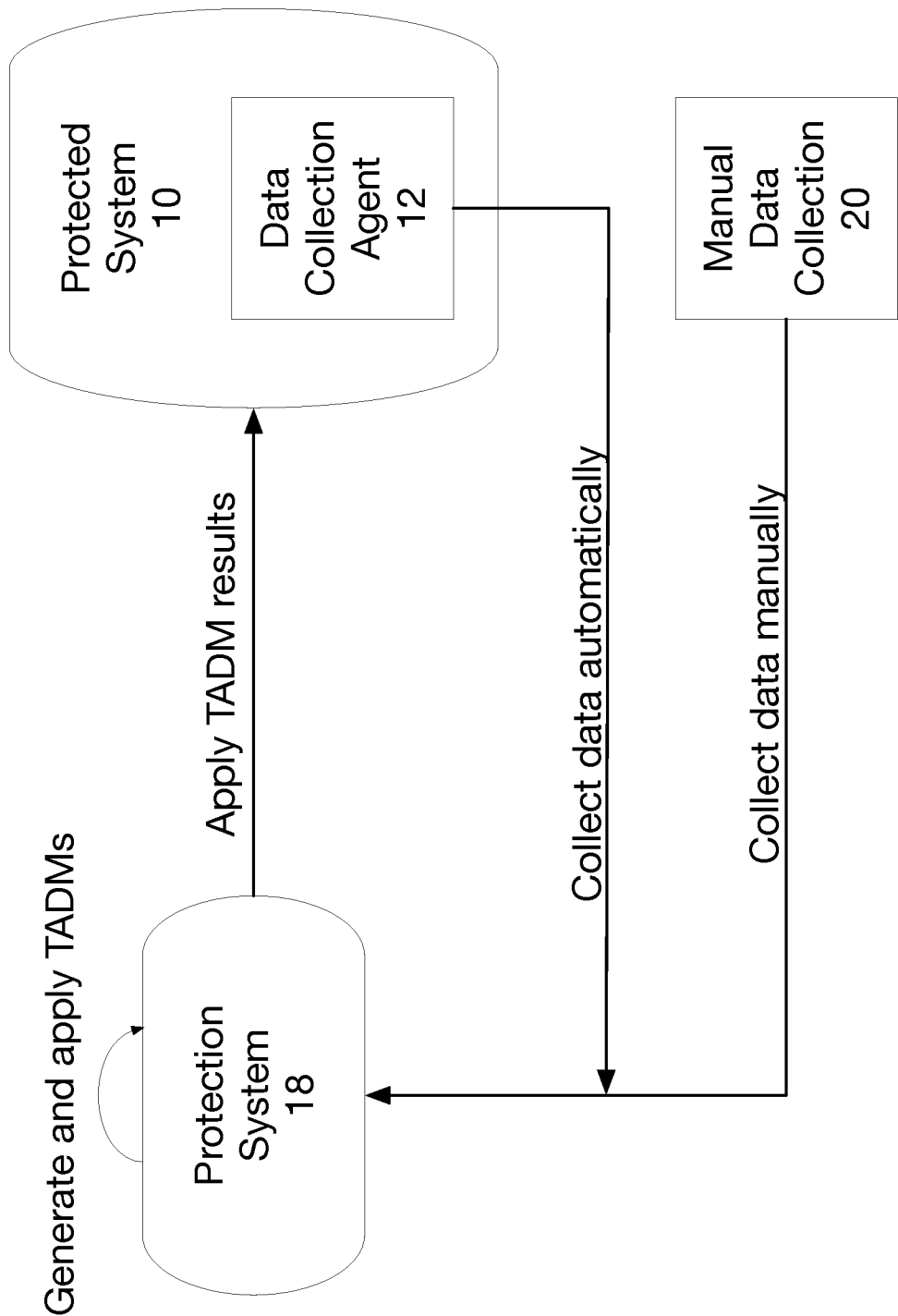

Referring now to FIGS. 1 and 2, an example of an architecture within which embodiments of the present invention may be implemented is shown. In this system, various protected systems, 10a, 10b, 10c, are instrumented with respective data collection agents (DCA) 12a, 12b, 12c. Each DCA is deployed at a respective protected system and gathers and reports information that system. For example, DCA 12a gathers and reports information collected from protected system 10a, DCA 12b gathers and reports information collected from protected system 10b, and DCA 12c gathers and reports information collected from protected system 10c. More generally, a DCA 12 gathers and reports information collected from its respective protected system 10. Manual data collection 20, may also be used, and the manually collected data (e.g., as input by a network administrator) may be provided to protection system 18.

The collected data is reported to the protection system 18, which generates the TADMs based on this information. The TADMs are then applied to all of the payloads detected by other means (e.g., signature-based approaches, statistical modeling of data within payloads, heuristic rules, behavioral rules, and/or analytical approaches, etc.) and the results are applied in respect of the protected systems 10a-10c by the protection system 18. Thus, traffic bound for a protected system, e.g., 10b, from a client 14 over a network 16 (e.g., the Internet) is evaluated by the protection system 18 using not only conventional attack detection processes, but also the present targeted attack detection metrics. Only traffic that is evaluated as being non-malicious is allowed to pass to the protected system.

The protected systems 10a-10c can be any desired resource, such as a computer system or server, an operating system running on a computer system, one or more databases, a filesystem, an application running on a computer system, e.g., a Web application or a user application, etc. Data collection, when performed by automated agents, can be accomplished by running software agents on the protected systems (or computer systems hosting the protected system) and include, but are not limited to, kernel module-based agents, system daemon agents, application code-implemented agents, source code parser agents, and/or SQL/noSQL agents. The data obtained by these agents includes, but is not limited to, SQL/no SQL database names, table names, column names, data types, and object structures; file names, sizes, and other attributes; application class names, packages, and namespaces; system library names, versions, hash sums, binary offsets of functions symbols inside libraries; etc.

By way of example, many modern databases are configured to provide schema and/or catalog views that include metadata concerning all or almost all of the entries in the database. These views can be called by a data collection agent associated with a protected database by running an associated query and the results stored to a library. Similarly, other database objects, tables, etc. can be uncovered in this fashion. In other embodiments, DCAs 12a, 12b, 12c may be associated with logging systems and configured to parse system logs for metadata concerning resources of a protected system.

To generate the TADMs, the protection system generates metrics that characterize potential targeted attacks based on/derived from the collected data. For example, range metrics may be derived from numeric data (sizes, lengths, etc.) including exact values (0 ranges); hashes for strings (table and column names, file names, application function names, etc.); regular expressions for strings; data trees for hierarchical data (e.g., folders and their files, tables and their columns, data structure dependencies, etc.); exported symbols of shared libraries and DLLs; offsets of functions in shared libraries and DLLs; domain name system (DNS) requests sent by the protected system; errors of kernel, applications, and services (including Web services) run on the protected system; etc.

To determine whether a current attack payload is associated with a targeted attack or not, the protection system calculates the TADMs for the current detected payload and compares them to the TADMs of the protected system for which the payload is destined. Applying the TADMs depends on the TADM type. For example, regular expression TADMs are applied as such, while numeric or range TADMs may involve computing a difference of two numbers. Hash matching may be employed in the case where a TADM is a hash result, and so on. Consequently, each payload registered by the protection system through other means will undergo further evaluation according to one or more TADMs. Using this information, the protection system can decide how relevant a current attack payload is for a protected system; i.e., whether it is associated with a targeted attack or not.

In operation then, traffic destined for a protected system is intercepted by a protection system configured in accordance with the present invention, and assessed using conventional threat detection means (e.g., signature-based approaches, statistical modeling of data within payloads, heuristic rules, behavioral rules, and/or analytical approaches, etc.). In some instances, this traffic assessment is performed by a separate protection system and identified payloads are reported to a protection system that is configured in accordance with embodiments of the present invention for targeted attack detection. In either instance, when suspect payloads are identified by these processes, the suspect payloads are additionally evaluated against the TADMs to determine if the payloads contain any references to specific resources of the protected system. For those payloads which the TADM assessment reveals positive results, the protection system provides an alert that a targeted attack has been recognized. This two-tier approach is useful so that only payloads associated with suspect attacks are evaluated against TADMs. In general, assessment against TADMs will also identify benign payloads that include protected system resource identifiers, so by limiting the TADM assessment to payloads already flagged as being associated with suspected attacks (e.g., as identified by one or more conventional threat detection processes), false positive identifications of targeted attack detections will be kept to a minimum.

What is claimed is:

1. A system for targeted attack detection, comprising:
one or more data collection agents (DCAs), each of the DCAs instantiated at a respective protected system, and configured to collect and report information regarding the respective protected system; and
a protection system communicably coupled to receive from the one or more DCAs the information collected at the respective protected systems and to create from said information threat attack detection metrics (TADMs) by which the protection system evaluates payloads of intercepted traffic destined for a first one of the protected systems from a remote client over a network, which payloads are first subjected to threat detection analysis by the protection system using one or more of a signature-based approach, statistical modeling of data within the payloads, heuristic rules, behavioral rules, and/or analytical approaches to identify suspect payloads in the intercepted traffic, before application of the TADMs by the protection system to determine whether the suspect payloads contain any references to specific resources of the first protected system.

2. The system of claim 1, wherein the TADMs are created using actual resource identifiers of the protected systems as reported by the DCAs.

3. The system of claim 1, wherein the protection system is configured to pass to the first protected system only traffic that is evaluated as being non-malicious.

4. The system of claim 1, wherein the protected systems comprise any of: computer systems, servers, operating systems running on the computer systems, databases, filesystems, and applications running on the computer systems.

5. The system of claim 1, wherein the DCAs comprise any of: kernel module-based agents, system daemon agents, application code-implemented agents, source code parser agents, and/or SQL/noSQL agents.

6. The system of claim 5, wherein the information collected and reported by the DCAs comprise any of: SQL/no SQL database names, table names, column names, data types, and object structures; file names, sizes, and other attributes; application class names, packages, and namespaces; and system library names, versions, hash sums, binary offsets of functions symbols inside libraries.

7. The system of claim 1, wherein the protection system generates the TADMs by generating metrics that characterize potential targeted attacks based on the collected and reported information.

8. The system of claim 7, wherein the metrics that characterize potential targeted attacks comprise any of: range metrics derived from numeric data, hashes for strings, regular expressions for strings, data trees for hierarchical data, exported symbols of shared libraries and DLLs, offsets of functions in shared libraries and DLLs, domain name system (DNS) requests sent by the protected systems, and errors of kernel, applications, and services run on the protected systems.

9. The system of claim 1, wherein the protection system is configured to determine whether the suspect payloads contain any references to the specific resources of the first protected system by calculating TADMs for the suspect payloads and comparing them to TADMs of the first protected system for which the suspect payloads are destined.

10. A method for targeted attack detection, comprising:
intercepting, by a protection system, traffic destined for a first protected system, the first protected system being one of a plurality of protected systems, the protection system communicably coupled to receive from one or more data collection agents (DCAs) instantiated at respective ones of the protected systems information collected at the respective protected systems and to create from said information threat attack detection metrics (TADMs) by which the protection system evaluates payloads of the intercepted traffic;
assessing the intercepted traffic using one or more of signature-based approaches, statistical modeling of data within payloads, heuristic rules, behavioral rules, and/or analytical approaches to identify suspect payloads in the intercepted traffic;
for the suspect payloads, evaluating by the protection system the suspect payloads against the TADMs to determine if the suspect payloads contain any references to specific resources of the first protected system; and
for those of said suspect payloads for which the TADM evaluation reveals a positive result, providing by the protection system an alert that an attack that targets the first protected system has been recognized.

11. The method of claim 10, wherein the TADMs are created using actual resource identifiers of the protected systems as reported by the DCAs.

12. The method of claim 10, wherein the protection system passes to the first protected system only traffic that is evaluated as being non-malicious.

13. The method of claim 10, wherein the first protected system comprises any of: a computer system, a server, an operating system running on the computer system, a database, a filesystem, and an application running on the computer system.

14. The method of claim 10, wherein the received information from the DCAs comprise any of: SQL/no SQL database names, table names, column names, data types, and object structures; file names, sizes, and other attributes; application class names, packages, and namespaces; and system library names, versions, hash sums, binary offsets of functions symbols inside libraries.

15. The method of claim 10, wherein the protection system creates the TADMs by generating metrics that characterize potential targeted attacks based on the received information from the DCAs.

16. The method of claim 15, wherein the metrics that characterize potential targeted attacks comprise any of: range metrics derived from numeric data, hashes for strings, regular expressions for strings, data trees for hierarchical data, exported symbols of shared libraries and DLLs, offsets of functions in shared libraries and DLLs, domain name system (DNS) requests sent by the protected systems, and errors of kernel, applications, and services run on the protected systems.

17. The method of claim 10, wherein evaluating the suspect payloads against the TADMs to determine if the suspect payloads contain any references to the specific resources of the first protected system comprises calculating TADMs for the suspect payloads and comparing them to TADMs of the first protected system for which the suspect payloads are destined.

* * * * *